United States Patent
Ommodt et al.

(10) Patent No.: US 7,263,293 B2
(45) Date of Patent: Aug. 28, 2007

(54) INDOOR WIRELESS VOICE AND DATA DISTRIBUTION SYSTEM

(75) Inventors: Kevin Ommodt, Allen, TX (US); Matthew Melester, McKinney, TX (US); Gregory A. Maca, Rockwall, TX (US); Donald Stone, Richardson, TX (US)

(73) Assignee: Andrew Corporation, Westbrook, IL (US)

( * ) Notice: Subject to any disclaimer, the term of this patent is extended or adjusted under 35 U.S.C. 154(b) by 769 days.

(21) Appl. No.: 10/166,277

(22) Filed: Jun. 10, 2002

(65) Prior Publication Data

US 2004/0203704 A1  Oct. 14, 2004

(51) Int. Cl.
*H04B 10/00* (2006.01)
(52) U.S. Cl. .................. 398/115; 398/116; 398/125
(58) Field of Classification Search .......... 398/99–100, 398/115–116, 118–131
See application file for complete search history.

(56) References Cited

U.S. PATENT DOCUMENTS

| | | | |
|---|---|---|---|
| 4,144,409 A | 3/1979 | Utano et al. | |
| 4,144,411 A | 3/1979 | Frenkiel | |
| 4,231,116 A | 10/1980 | Sekiguchi et al. | |
| 4,451,699 A | 5/1984 | Gruenberg | |
| 4,456,793 A | 6/1984 | Baker et al. | |
| 4,475,010 A | 10/1984 | Huensch et al. | |
| 4,485,486 A | 11/1984 | Webb et al. | |
| 4,525,861 A | 6/1985 | Freeburg | |
| 4,556,760 A | 12/1985 | Goldman | |
| 4,613,990 A | 9/1986 | Halpern | |
| 4,669,107 A | 5/1987 | Eriksson-Lennartsson | |
| 4,759,051 A | 7/1988 | Han | |
| 4,790,000 A | 12/1988 | Kinoshita | |
| 4,797,947 A | 1/1989 | Labedz | |
| 4,831,662 A | 5/1989 | Kuhn ......................... 455/608 |

(Continued)

FOREIGN PATENT DOCUMENTS

CA          2008900          10/1990

(Continued)

OTHER PUBLICATIONS

41st IEEE Vehicular Technology Conference, *Gateway to the Future Technology in Motion*. St. Louis, MO, May 1991.

(Continued)

*Primary Examiner*—Dzung Tran
(74) *Attorney, Agent, or Firm*—Wood, Herron & Evans, LLP

(57) ABSTRACT

A wireless voice and data system for improving coverage in an enclosed area includes a hub device for transceiving RF signals with a signal source positioned generally removed from an enclosed area. The hub device includes voice hardware for processing voice signals, data hardware for processing data signals, and combining hardware for combining and separating voice signals and data signals in the hub device. A remote access point device for transceiving signals with customer equipment includes voice hardware for processing voice signals, data hardware for processing data signals, and combining hardware for combining and separating voice signals and data signals in the remote access point. An optical fiber system is coupled between the hub device and the remote access point device and is operable for modulating and demodulating the combined voice and data signals for communicating between the hub device and remote access point device.

52 Claims, 3 Drawing Sheets

U.S. PATENT DOCUMENTS

| | | | |
|---|---|---|---|
| 4,916,460 A | 4/1990 | Powell | |
| 4,932,049 A | 6/1990 | Lee | |
| 5,067,147 A | 11/1991 | Lee | |
| 5,067,173 A | 11/1991 | Gordon et al. | |
| 5,159,479 A | 10/1992 | Takagi | |
| 5,175,867 A | 12/1992 | Wejke et al. | |
| 5,193,109 A | 3/1993 | Chien-Yeh Lee | |
| 5,243,598 A | 9/1993 | Lee | |
| 5,267,261 A | 11/1993 | Blakeney, II et al. | |
| 5,278,690 A | 1/1994 | Vella-Coleiro | |
| 5,280,472 A | 1/1994 | Gilhousen et al. | |
| 5,285,469 A | 2/1994 | Vanderpool | |
| 5,297,193 A | 3/1994 | Bouix et al. | |
| 5,301,056 A | 4/1994 | O'Neill | |
| 5,303,287 A | 4/1994 | Laborde | |
| 5,305,308 A | 4/1994 | English et al. | |
| 5,309,474 A | 5/1994 | Gilhousen et al. | |
| 5,339,184 A | 8/1994 | Tang | |
| 5,381,459 A | 1/1995 | Lappington | |
| 5,392,453 A | 2/1995 | Gudmundson et al. | |
| 5,408,497 A * | 4/1995 | Baumann et al. | 375/219 |
| 5,627,879 A | 5/1997 | Russell et al. | |
| 5,642,405 A | 6/1997 | Fischer et al. | |
| 5,644,622 A | 7/1997 | Russell et al. | |
| 5,657,374 A | 8/1997 | Russell et al. | |
| 5,852,651 A * | 12/1998 | Fischer et al. | 379/56.2 |
| 5,983,068 A * | 11/1999 | Tomich et al. | 725/32 |
| 6,850,512 B1 * | 2/2005 | Bishop et al. | 370/342 |
| 2002/0048071 A1 * | 4/2002 | Suzuki et al. | 359/173 |
| 2002/0063924 A1 * | 5/2002 | Kimbrough et al. | 359/125 |

FOREIGN PATENT DOCUMENTS

| | | |
|---|---|---|
| EP | 0166885 | 4/1985 |
| EP | 0346925 | 6/1989 |
| EP | 0368673 | 11/1989 |
| EP | 0391597 | 4/1990 |
| EP | 0468688 | 7/1991 |
| JP | 58-164007 | 6/1983 |

OTHER PUBLICATIONS

41st IEEE Vehicular Technology Conference, *Personal Communication—Freedom Through Wireless Technology*, Secaucus, NJ, May 1993.

Vehicular Technology Society 42nd VTS Conference Frontiers of Technology, *From Pioneers to the 21st Century*, Denver, CO, May 1992.

City Cell, Cellular Industry the Day Group, *ADC Kentrox CityCell Field Trial Yields Another First: Simultaneous Analog and Digital Calls*, (1 page).

Electrical Communications Laboratories, *A Two-Way Wavelength—Division—Multiplexing Transmission and Its Application to a Switched TV Distribution System*, (10 pages).

Microwaves & RF, *Offshore Markets Gain in Size, Competitiveness, Even the Smallest Industry Companies Are Expanding Their Global Business, Despite Such Costly Distractions as ISO 9000*, Mar. 1993.

Russell, David, *New Microcell Technology Sets Cellular Carriers Free*, Telephony, Mar. 1993, pp. 40, 42, and 46.

The Day Group, *New Signal Transport Technology Digitizes The Cellular Band*.

\* cited by examiner

INDOOR WIRELESS VOICE AND DATA DISTRIBUTION SYSTEM

FIELD OF THE INVENTION

This invention is directed generally to wireless communication systems, and particularly to a wireless system for providing voice and data to customers.

BACKGROUND OF THE INVENTION

Wireless communication systems are becoming increasingly utilized by a wide variety of consumers. Traditionally, wireless voice systems have driven the use of such technology. In fact, wireless voice traffic has exploded in the last few years.

Wireless communication systems also include wireless data services. Consequently, a rapidly growing demand for wireless data services has coincided with the increased wireless voice traffic. Therefore, there is a need for systems which can provide both wireless voice access and wireless data access.

As wireless communication systems become more ubiquitous, the demand has increased for improved coverage inside confined areas, such as buildings and tunnels. As a result, products exist for providing the distribution of wireless voice traffic in confined areas, such as inside a building. For example, Andrew Corporation, which is the owner of the present application, currently offers the InCell™ System for in-building wireless communications. The InCell™ System improves and extends the RF voice traffic coverage, such as for cell phones and pagers, into buildings and other hard-to-penetrate indoor areas. The InCell™ System, for example, can support cellular and PCS communication services, and also has dual-band capabilities for carrying multiple wireless services. The InCell™ System can also be easily upgraded to accommodate third generation (3G) services. As such, the InCell™ System offers a quick, simple, and cost-effective way of extending and improving in-building wireless voice coverage without resorting to major structural work within the building.

Also coinciding with the demand for wireless data services, several wireless service providers are deploying wireless data networks, in similar venues inside buildings. Such wireless data networks generally conform to the 802.11b standard. However, such data systems are usually specifically dedicated to data traffic, and are generally not expandable with respect to other wireless services. Furthermore, such existing wireless data networks require significant structural work or retrofitting of a building in order to install such systems, in addition to any wireless voice system that is installed in the building.

As may be appreciated, facility operators may be reluctant to undertake additional installations, for example, in addition to a voice system installation, if structural work is significant. Specifically, a facility operator who has made an initial investment with respect to installing either a wireless voice system or a wireless data system, does not want to then turn around and install another such system for providing improved wireless voice and/or data coverage within the same building.

Furthermore, wireless data service providers are often not as financially strong as typical wireless voice service providers, and thus may also be reluctant to install their systems within a venue which would require significant installation costs.

Accordingly, it would be desirable to have a system which improved and extended voice and data coverage indoors, such as within a building or hard-to-penetrate areas, and which may be readily and cost-effectively installed. As such, it would be desirable for such a system that combines both the capabilities of wireless voice extension and wireless data delivery, and which would require only a single installation.

It is also desirable to be able to retrofit an existing in-building wireless voice system for providing in-building coverage for wireless voice and data services.

Accordingly, the present invention addresses these desires within the market, and provides a system for providing indoor wireless voice and data distribution.

BRIEF DESCRIPTION OF THE FIGURES

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

Figure 1A:
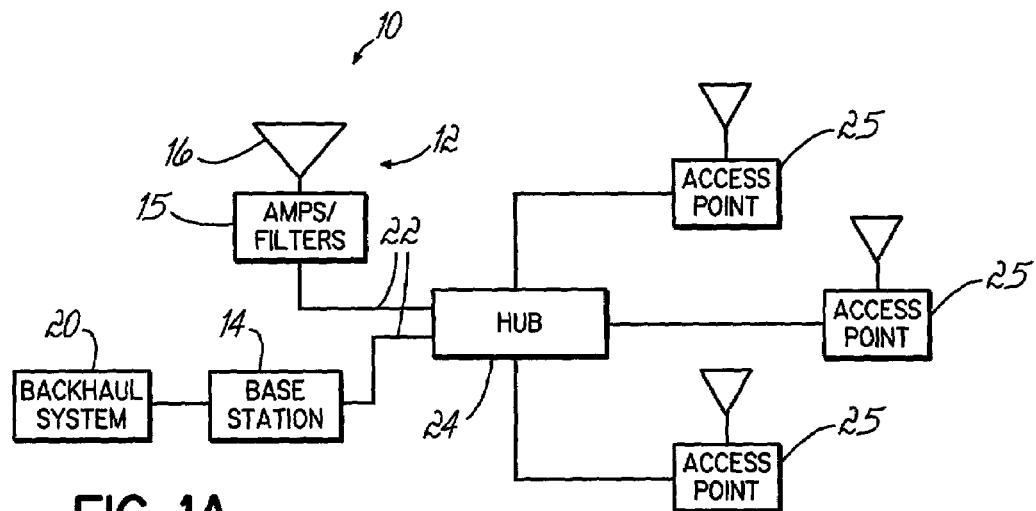
FIGS. 1A and 1B are schematic views of embodiments of in-building systems in accordance with aspects of the present invention.

FIG. 1A illustrates system 10 in accordance with one embodiment of the invention. System 10 is a system which would be utilized generally indoors, such as inside of a building, tunnel, subway, or other difficult-to-penetrate area, for providing wireless communications, both in the form of voice and data communications in the indoor area. System 10 comprises a signal source 12. The signal source 12 may be one or more different configurations for handling wireless traffic. For example, it may include a base station 14 and associated hardware, which is coupled, for example, through a wired or wireless backhaul system 20 to a switching center. Alternatively, an antenna 16 for transceiving the wireless communication signal may be coupled to the hub 24 through appropriate amplifiers and filters 15. Base station 14 and antenna 16 might be located outside of the building as an outdoor base station, or alternatively, might be located inside of the building, as an in-building base station (e.g. microcell, picocell). Other configurations might also be utilized. The base station hardware and other electronics of the system 10 might be located inside of the building, or outside. For example, system 10 may utilize a roof-mounted off-air donor antenna and repeater amplifier. In any case, wireless communication signals are transceived by the system 10 associated with a building or other confined area.

For providing wireless voice communications, systems exist for indoor wireless voice distribution. For example, as noted above, Andrew Corporation, headquartered in Orland Park, Chicago, offers the InCell™ system which extends wireless voice coverage into buildings and other areas. The current InCell™ system provides wireless voice coverage.

In accordance with one aspect of the present invention, the InCell™ system might be retrofitted, as discussed herein, for providing wireless voice extension as well as wireless data delivery services within a single installation.

To that end, wireless communication signals, such as voice signals from base station 14, are routed on line 22 to a hub or hub device 24. The hub 24 might be an Andrew InCell™ hub or Central Distribution Unit (CDU) which has been modified in accordance with the principles of the present invention. The hub 24 is operably coupled to a plurality of remote access points 25 for distributing the wireless signals. The remote access points or remote access point devices, in one embodiment of the invention, might be Remote Antenna Units (RAUs) of the InCell™ System.

Figure 1B:
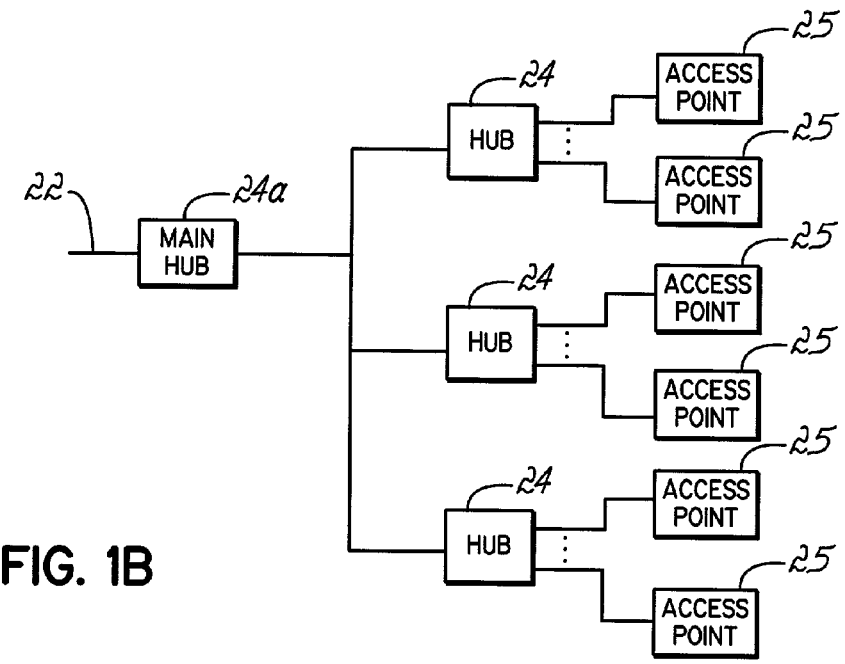

FIG. 1B illustrates an alternative arrangement using multiple hubs. Specifically, signals on line 22 may be routed to a main hub 24a whereupon it is distributed to other hubs 24, and then to the remote access points 25. The system herein is described with respect to a single hub and its respective access points. However, multiple hubs coupled to a main hub might also be utilized for practicing the invention.

Figure 3B:
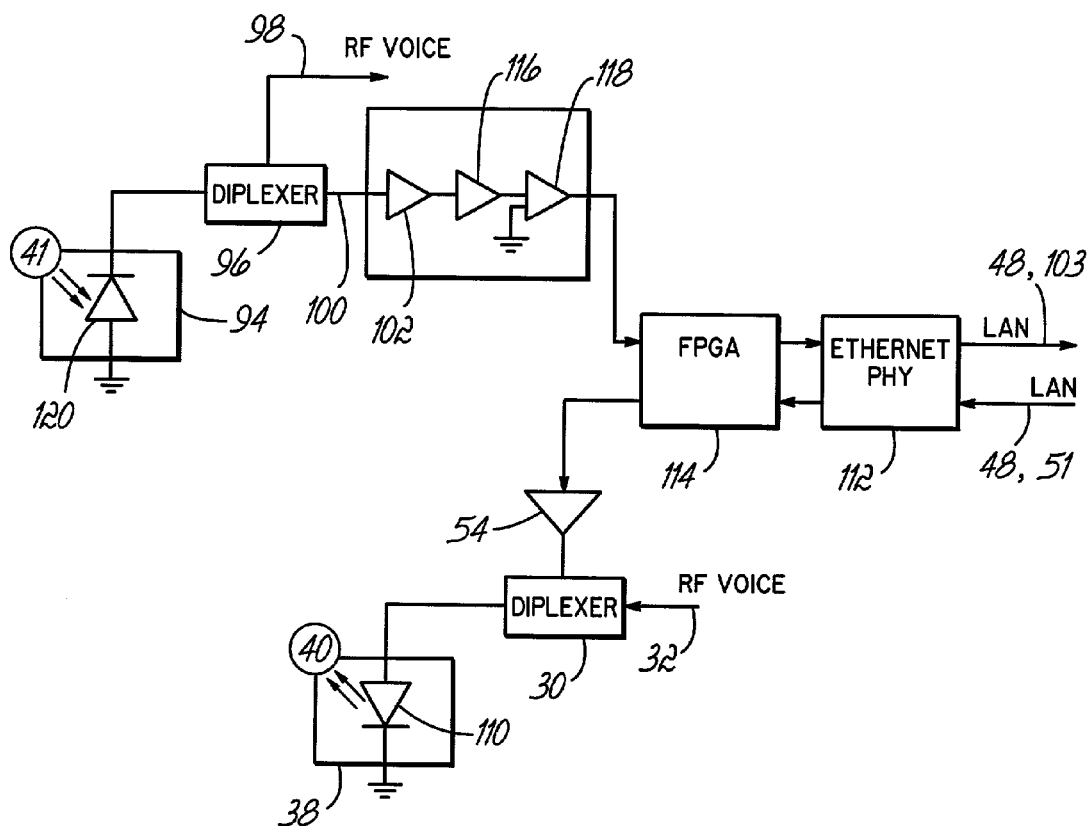
FIG. 3B is a schematic view of an embodiment of a bridge circuit.
Figure 3:
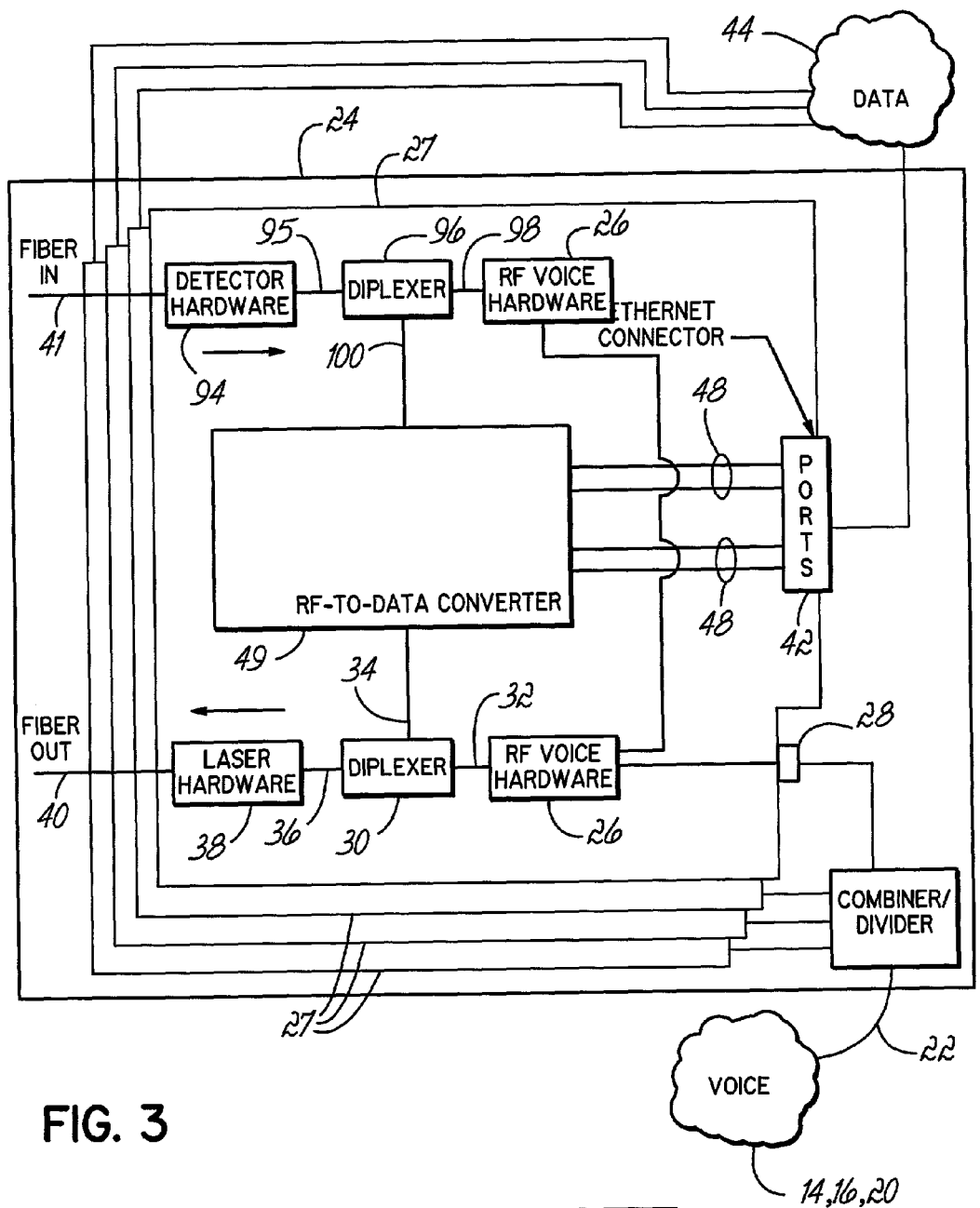
FIG. 3 is a schematic view of a hub in the system of FIG. 1.

FIG. 3 is a schematic diagram of a suitable hub 24 for one embodiment of the invention. Hub 24 includes multiple hub circuits 27 for handling voice and data traffic for multiple customers and various locations. Each hub circuit 27 includes appropriate fiber links 40, 41 to a remote access point 25. Appropriate RF voice hardware, which is indicated by reference numeral 26 in FIG. 3, interfaces with the base station 14 for processing voice signals. The RF voice hardware 26 is shown as two separate blocks for the up-link and down-link sides of the system. However, the hardware 26 might also be indicated schematically by a single box, for both the up-link and down-link paths. The RF voice hardware 26 couples to base station 14, antenna 16, and/or wired backhaul 20 through a suitable connector, such as a Type N connector 28. The voice signals and other wireless traffic are coupled between the signal source and hub, through a suitable combiner/divider circuit 29 for reducing the number of cables 22 between hub 24 and the base station 14 or antenna 16. The RF voice hardware 26 may include appropriate circuitry, such as amplification circuitry and/or filtering circuitry for processing the RF voice signals from the base station wired backhaul or other signal source on path of cable 22. Alternatively, amplification and filtering circuitry might be included within the base station or elsewhere apart from hub 24, and the RF voice hardware 26, would be essentially the necessary cables and connectors for providing a signal path to the hub circuits 27 to then be communicated with various remote access points 25, as illustrated in FIG. 1.

Hub 24 further includes hardware for combining and separating voice signals on lines 32, 98 and data signals on lines 34, 100. In the disclosed embodiment diplexing hardware, such as diplexers 30, 96 are illustrated, although the multiple boxes shown for the uplink and downlink sides may be combined into a single circuit. The voice signals on line 32 could be in any suitable wireless communication band, such as the traditional cellular band, at around 800 MHz, or the PCS band, around 1900 MHz, or any other suitable wireless communication frequency band, including any designated 3G band. For example, InCell™ models are currently available for Cellular/PCS or GSM/DCS-1800.

In the current application, the terms "voice signals," or "voice traffic" are generally utilized to indicate wireless signals or traffic which are in a frequency band which is utilized for wireless voice communications. However, some such frequency bands are also used for data traffic as well as voice traffic. For example, the PCS band is utilized for both voice and data. Also, 3G bands may be utilized for voice and data. Therefore, signals which may be carrying voice traffic might also have data traffic as well. Consequently, the terms "voice signals" or "voice traffic" as used herein are not limited only to voice traffic, but may include data traffic or data components as well, such as data over the PCS band. Therefore, in one aspect of the invention, voice/data in an RF band might be combined with other data in a data format such as 802.3 Ethernet format.

The present invention provides voice signals (with voice or data) over conventional wireless voice bands in combination with high speed data traffic, such as through a high speed 802.3 or 802.11 standard data protocol. Therefore, data may also be present along with the voice/data traffic or signals designated as "voice signals."

A data connection may be provided for hub 24 via an appropriate high speed data network 44 through appropriate ports 42 and suitable switching. The data network 44, in one embodiment of the invention, may be hard wired to the hub. Switching circuitry may be necessary with network 44 for handling the data traffic that may be associated with the multiple remote access points 25. The data traffic from network 44 may be in an appropriate format, such as an Ethernet 802.3 format. The ports 42 may include Ethernet connection hardware to provide paths for the data between network 44 and the hub circuitry 27. As shown in FIG. 3, each of the various circuits 27 has data ports 42 associated therewith for providing data capability for the various and respective remote access points 25. The network data signals are converted between a data format and an appropriate RF format for transmission, as discussed below.

The combined or diplexed RF data signals and voice signals on line 36 are directed to laser hardware 38. The laser hardware 38 converts the RF signals to appropriate optical signals on line 40, which is indicated as FIBER OUT for the hub 24. For example, a laser diode 110 might be utilized (see FIG. 3B). Therefore, the combined signals on line 40 contain both voice and data traffic from the hub. In one embodiment, the signals are AM modulated on appropriate optical fiber 40. The laser hardware 38, detector hardware 94, and appropriate lines or cables 40, 41, are part of the optical fiber system of the invention for communicating between the hub and remote access points on optical fiber. The optical fiber 40 might be included within a cable along with DC power lines for powering the remote access points 25. The optical fiber is a suitable fiber, such as single mode fiber, which has high performance characteristics, low loss, and wide bandwidth.

In one embodiment, a single fiber line or strand might be utilized to carry the combined voice and data traffic together in a cable. Alternatively, the voice traffic is carried on a different fiber line or strand from the data traffic, even though both voice and data strands might be coupled together into a unitary composite cable. As is discussed below, FIBER IN also exists for each hub. Similarly, the combined voice/data traffic on the FIBER IN side of the circuits might be communicated over a single fiber line/strand, or separate lines/strands might be used for voice traffic and separately for data traffic, with the separate strands incorporated into a composite cable.

As noted, for data capabilities, hub 24 includes a plurality of data ports 42 which are appropriately coupled to transfer data between hub 24 and network 44 or some other data source, as noted above. In one embodiment of the invention, network 44 might be hard wired to the ports 42. Alternatively, such connection might be wireless. The data from various sources may thereby be properly routed to and from hub 24.

Incoming data, such as on lines 48 is routed to appropriate RF-to-DATA Converter circuitry 49. The RF-to-DATA converter circuitry 49 converts the data traffic into an appropriate RF form for routing over the fiber 40, 41 between the appropriate hub 24 and remote access points 25.

Figure 3A:
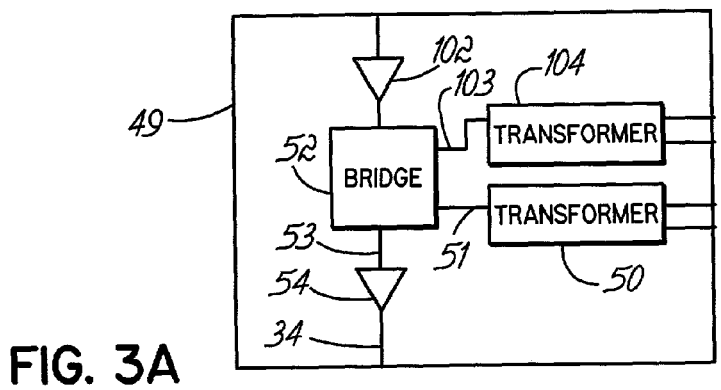
FIG. 3A is a schematic view of an RF-to-DATA converter embodiment for the present invention.

FIG. 3A discloses one possible embodiment of RF-to-DATA converter circuitry 49. Transformers 50, 104 are provided for handling any DC components associated with data lines 48. Generally, the optical fiber connection 40, 41 between the hub 24 and the remote access points 25 generally cannot have a DC component thereon. Transformer circuitry interfaces through lines 51 and 103 with a bridge circuit 52, which in turn interfaces with appropriate amplifiers 54, 102 through lines 53 and 100, respectively.

For example, data on line 51 may be delivered to a bridge circuit 52 which acts to regenerate the digital data signal for quality, and also to convert the signal to a proper RF format to be diplexed or combined at diplexer 30, and ultimately combined over fiber (40 FIBER OUT) to the remote access points 25. The converted data signal on line 53 may then be amplified by an appropriate amplifier 54, diplexed with voice traffic by diplexer 30, and transmitted out over the FIBER OUT link 40 to the remote access points 25. As noted above, the FIBER OUT link might utilize a single fiber strand for both voice and data, or multiple strands to handle the voice and data traffic separately.

Bridge circuit 52 illustrated in FIG. 3A is used to convert the signal to a proper RF format to be diplexed or combined with other wireless traffic over fiber for transmission to the remote access point 25. FIG. 3B illustrates one embodiment of suitable bridge circuitry to be used in the invention. FIG. 3B also illustrates other components of the system coupled with the bridge circuitry.

Turning to FIG. 3B, signals on appropriate network lines 48 are coupled to an Ethernet physical layer interface circuit, or Ethernet PHY 112. As illustrated in the Figure, the lines may be coupled to an appropriate data network, such as a LAN. The Ethernet PHY circuitry 112 takes a data signal and its associated timing off of the LAN lines 48 and extracts the data. Coupled with the Ethernet PHY 112 is a field programmable gate array (FPGA) which functions to provide a Manchester modulation and demodulation function to provide Manchester encoded data. Incoming data to the hub, such as on LAN line 51, is properly handled by the FPGA 114 and is amplified by amplifier 54 and provided to the diplexer 30 for combination with voice signals. The laser hardware 38, for example, including a laser diode 110, then converts the combined signals to a format for proper transmission over fiber. On the FIBER IN side 41 of hub 24, diplexer 94 separates the data and RF voice signals and provides the data signals (line 100) to the RF-to-data converter 49 and the bridge circuitry 52. Data on line 100 is amplified by an LNA 102 and by a limiting amplifier 116. It is then passed through threshold circuitry 118 to provide the desired digital signal for use by FPGA 114 and Ethernet PHY 112. The data is then converted to a suitable Ethernet format for transmission over outgoing LAN line 103. Accordingly, the bridge circuitry 52 of the hub provides interfacing between two different types of networks.

In accordance with one aspect of the present invention, the FPGA circuitry 114 and the provision of the Manchester encoded data provides an improvement in the ability of the system to detect the incoming combined data and voice traffic from the fiber. Specifically, problems can sometimes arise in the detector hardware, such as hardware 94 of the system, due to the non-linearity of the laser diode 110. Ethernet signals and the associated data traffic often arrive at the hub in bursts and thus are forwarded from the hub to the remote access point in similar bursts. Usually, to handle such bursts, specific receiver and/or detector hardware would be necessary. Such specialized detector hardware requires high signal levels and intermods from the laser diode.

To address such a problem and to eliminate the need for such specialized receiver and detector hardware, the present invention utilizes the Ethernet PHY circuitry 112 and the FPGA circuitry 114 to provide a clock at all times on the data lines. That is, there will always be digital traffic regardless of whether burst data is being sent or not. In accordance with one aspect of the present invention, this allows a different detector to be utilized, which may be utilized at desirable lower power levels. For example, when the stream of data provided by the present invention is constant, it is generally not necessary to detect peaks, and therefore, the detector hardware can settle. Normally, the Ethernet PHY circuitry 112 creates a decoder clock which is embedded in the data. The clock would be turned off when the data packet is complete. However, in accordance with an aspect of one embodiment of the invention, the clock is left on, and the Manchester-encoded data is operating for all clock cycles, regardless of whether burst data is being sent or not. For example, a constant stream of digital 1($s$) may be utilized in the absence of the burst data to achieve the desirable results of the invention and utilize detectors which work at lower power levels. That is, the FPGA circuitry 114 will always have a clock signal regardless of whether Ethernet burst data is being sent.

The path described above is generally for delivering voice and data to a remote access point. The operation at the remote access point, will now be described, followed by a description of the return traffic from the remote access point.

Figure 2:
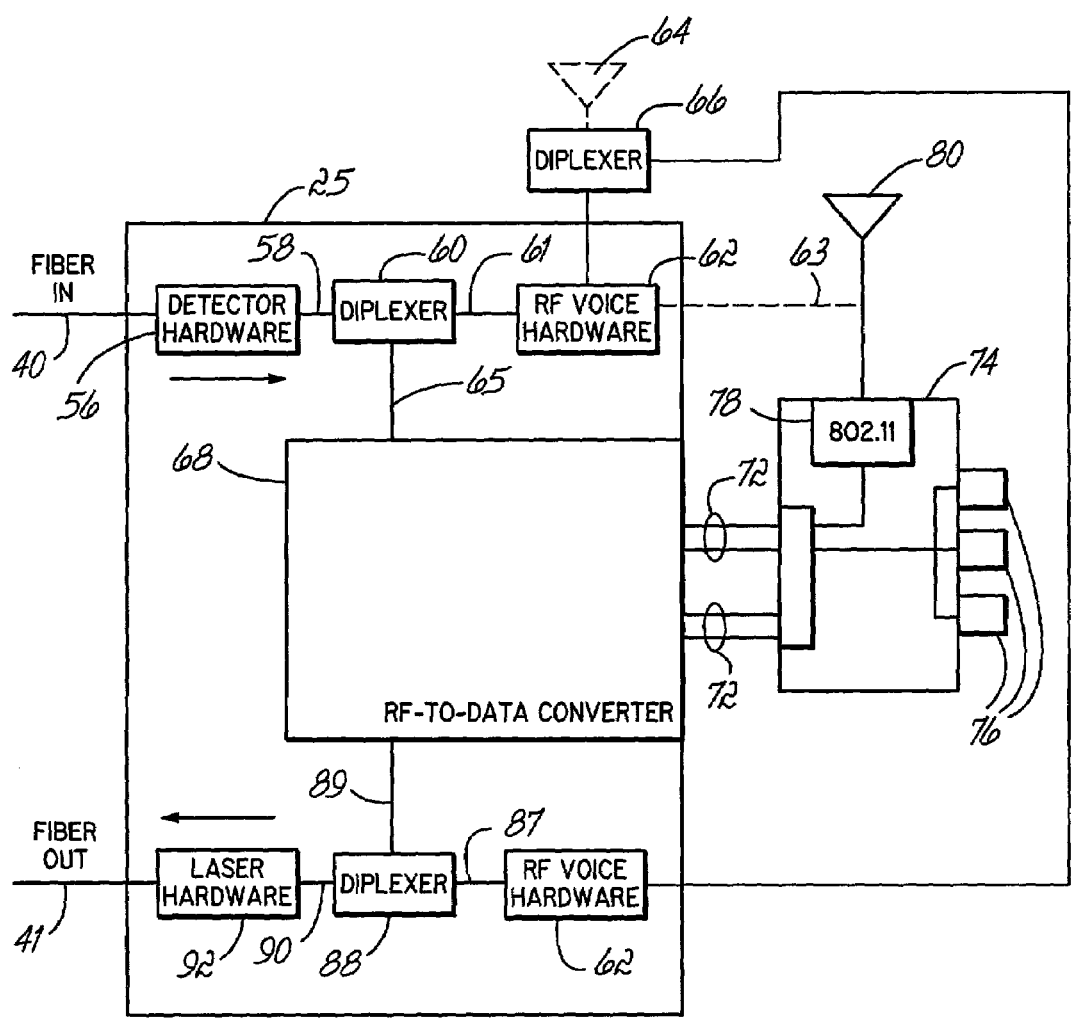
FIG. 2 is a schematic view of a remote access point of the system of FIG. 1.

Turning now to FIG. 2 and the remote access point 25, the FIBER OUT link 40 is indicated as the FIBER IN link 40 to the remote access point. Remote access point 25 includes detector hardware 56, which is part of the optical fiber system and is operable to demodulate the optical signals and convert them to appropriate RF signals for further separation, processing, and transmission. For example, such detector hardware may comprise a photodiode detector 120, as shown in FIG. 3B. As noted, the optical information may be AM modulated on the fiber link 40. Therefore, the detector hardware 56 would provide AM demodulation and appropriate conversion to an RF signal for further processing on line 58. A diplexer 60, or other separating circuit then separates the respective RF voice and data signals.

The voice signals are coupled through line 61 to RF voice hardware 62, where they are appropriately amplified, filtered, and/or further processed for wireless transmission, such as over an antenna 64 at the remote access point 25 for enhancing voice coverage within a building. A diplexer 66 might be utilized for handling uplink and downlink capabilities through the remote access point. The RF voice hardware 62 and remote antenna 64, for example, may be similar to the current components for the RAU of the Andrew InCell™ System. Simultaneously, the data signals on line 65 are directed to appropriate RF-to-DATA converter circuitry 68. The RF-to-DATA converter circuitry might be similar to the circuitry illustrated in FIG. 3A and discussed above, and will convert the data traffic to the appropriate format, such as the Ethernet 802.3 network format for transmission of the data signals over lines 72 to data circuit 74. Furthermore, the bridge circuit of the circuitry 68 may be the same as discussed in FIG. 3B, above.

The data circuit 74 may be a commercially available data circuit which provides appropriate network connections, such as 802.3 Ethernet port connections, and/or wireless Ethernet connections under the 802.11 standard. To that end, the data signals 72 might be routed to hardwired ports 76, or may be converted by appropriate circuitry 78 to the 802.11 wireless Ethernet format and retransmitted, such as over antenna 80. Remote access point 25 illustrated in FIG. 2 shows two possible antennas 64, 80 for transmission of the voice and data signals independently. Alternatively, a single antenna structure 80 and associated hardware might be utilized for transmitting both voice and data in a wireless format, as illustrated by reference numeral 63.

At the remote access point 25, network ports 76 might be provided as hardwired ports for a user to plug their equipment (e.g., a laptop computer) into when desired. At the remote access point, incoming data is also received from users/customers coupled to the access point 25 either through a wired (ports 76) or wireless (antenna 80) link. The incoming data at remote access point 25 is routed on lines 72 to the RF-to-DATA converter 68. The converted RF data output on line 89 is then combined at diplexer 88 with any incoming voice traffic from antenna 64 (or 80) and RF voice hardware 62 through diplexer 66. In the remote access point 25, the RF voice hardware 62 is indicated schematically with two separate boxes to indicate the separate uplink and downlink paths coupled to the diplexer 66. However, generally the hardware is combined as is conventional and coupled to a single antenna 64. Similarly, the uplink and downlink data paths 72 are illustrated as separate paths and may be combined together in a hardware design.

The voice traffic on line 87 and data on line 89 is combined or diplexed and then the combined RF signals are directed on line 90 to laser hardware 92 which may be similar to the laser hardware 38 in the hub 24. Laser hardware converts the combined RF signals to suitable optical signals, such as by amplitude modulation, and directs them over a fiber cable or line 41 back to the hub 24, wherein the fiber line 41 is indicated as FIBER IN, bringing incoming voice and data traffic to the hub from the remote access point. At the hub 24, detector hardware 94 demodulates the optical signal and converts it to RF on line 95. The combined voice and data traffic is separated at diplexer 96, and the voice data is directed on line 98 to the voice hardware 26 where it is then coupled through connector 28 and appropriate cabling 22 back to an indoor or outdoor base station 14, or a wired backhaul system 20. The voice traffic is then transmitted, such as back to another base station remote from the building or structure in which the present system 10 is installed. Data traffic on line 100 is directed to RF-to-DATA converter 49 where it is converted and conditioned for transmission in an Ethernet format, such as an Ethernet 802.3 format, or in a wireless format, such as 802.11. The data is then directed on appropriate lines 48 to applicable ports 42 for coupling with an external data network 44.

The present invention thus provides the distribution of voice and data traffic on an indoor wireless system and provides for greater wireless voice coverage within a building, while simultaneously providing a system for data transmission and access.

In accordance with another aspect of the present invention, an existing indoor wireless voice system, such as the Andrew InCell™ system, might be retrofitted by providing a data access hardware module at existing remote access points, which may be plugged in to provide data access through the remote access point or remote antenna unit. In one embodiment, all of the available access points might be equipped for both voice and data. Alternatively, only select remote access points might be equipped with both voice and data. In that way, some existing remote access points might be voice only, often referred to as RAUs within the Andrew InCell™ system. In a still further alternative, other remote access points might provide only remote data access.

One particular feature of the present invention is that it will allow data providers and Internet service providers to couple into an existing voice system relatively inexpensively. Voice service providers, such as cellular phone service providers, will often have the financial wherewithall to provide the initial indoor system for extending voice access for their customers. Data providers, on the other hand, often will not have similar financial resources or financial motivation for originally installing an indoor data access system. Furthermore, facilities operators will often not want to make additional installations, particularly if they are costly or disruptive to the facility. The present invention will allow data service providers to retrofit an existing and installed system for their capabilities and to possibly co-partner with voice service providers at a reduced financial investment level. The present invention would also be desirable for facility operators, because only a single installation would be required for both voice and data, rather than two separate installations.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A hub device for use in a wireless voice and data system for improving coverage in an enclosed area, the hub device comprising:

circuitry for transceiving RF signals with a signal source positioned generally removed from an enclosed area;

voice hardware for processing voice signals in an RF wireless voice format that is used for RF wireless voice communications;

data hardware for processing data signals in a data network format that is different from the RF wireless voice format; and an RF-to-DATA converter circuit operable for converting data signals between the data network format and an appropriate RF format compatible with the RF wireless voice format in order to combine and separate the voice signals and data signals in the hub device for common transmission;

circuitry, in the RF-to-DATA converter circuit, for providing a continuous digital stream in the absence of data signals for providing generally continuous signals to be combined with the voice signals when data is not present;

combining hardware operable for combining and separating voice signals and data signals in the hub device;

optical fiber transceiving circuitry operable for modulating and demodulating the combined voice and data signals for communicating with at least one remote access point device coupled in the system.

2. The hub device of claim 1 wherein said hub device data hardware comprises a network connection for coupling to a data network for processing data through the network.

3. The hub device of claim 2 wherein said network connection is an 802.3 Ethernet connection.

4. The hub device of claim 1 wherein the RF-to-DATA circuit comprises circuitry for providing Manchester modulation and demodulation.

5. The hub device of claim 1 wherein said optical fiber transceiving circuitry is operable for modulating and demodulating the combined signals for communication over optical fiber.

6. The hub device of claim 1 wherein said RF-to-DATA circuit includes amplification circuitry for amplifying signals converted between a data network format and the appropriate RF format.

7. A remote access point device for use in a wireless voice and data system for improving coverage in an enclosed area, the remote access point device comprising:
  circuitry for transceiving signals with customer equipment,
  voice hardware for processing voice signals in an RF wireless voice format that is used for RF wireless voice communications;
  data hardware for processing data signals in a data network format that is different from the RF wireless voice format;
  an RF-to-DATA converter circuit operable for converting data signals between the data network format and an appropriate RF format compatible with the RF wireless voice format in order to combine and separate the voice signals and data signals in the hub device for common transmission; and
  circuitry, in the RF-to-DATA converter circuit, for providing a continuous digital stream in the absence of data signals for providing generally continuous signals to be combined with the voice signals when data is not present;
  combining hardware operable for combining and separating voice signals and data signals in the remote access point device;
  optical fiber transceiving circuitry operable for modulating and demodulating the combined voice and data signals for communicating with a hub device coupled in the system.

8. The remote access point device of claim 7 wherein the RF-to-DATA circuit comprises circuitry for providing Manchester modulation and demodulation.

9. The remote access point device of claim 7 further comprising an antenna for transceiving signals with customer equipment.

10. The remote access point device of claim 9 wherein said voice hardware of the remote access point device is coupled to the antenna.

11. The remote access point device of claim 9 wherein said data hardware of the remote access point device is coupled to the antenna.

12. The remote access point device of claim 9 wherein both of said voice hardware and data hardware of the remote access point device are coupled to the antenna.

13. The remote access point device of claim 7 wherein said data hardware is operable for processing data signals in an 802.11 wireless network format.

14. A wireless voice and data system for improving coverage in an enclosed area, the system comprising:
  a hub device for transceiving RF signals with a signal source positioned generally removed from an enclosed area, the hub device including voice hardware for processing voice signals in an RF wireless voice format that is used for RF wireless voice communications;
  the hub device further including data hardware for processing data signals in a data network format that is different from the RF wireless voice format and an RF-to-DATA converter circuit operable for converting data signals between the data network format and an appropriate RF format compatible with the RF wireless voice format in order to combine and separate the voice signals and data signals in the hub device;
  circuitry, in the hub device RF-to-DATA converter circuit, for providing a continuous digital stream in the absence of data signals for providing generally continuous signals to be combined with the voice signals when data is not present; and
  combining hardware operable for combining and separating voice signals and data signals in the hub device;
  a remote access point device for transceiving signals with customer equipment, the remote access point device including voice hardware for processing voice signals in an RF wireless voice format that is used for RF wireless voice communications, data hardware for processing data signals in a data network format that is different from the RF wireless voice format, an RF-to-DATA converter circuit operable for converting data signals between the data network format and an appropriate RF format compatible with the RF wireless voice format in order to combine and separate the voice signals and data signals in the access point;
  circuitry, in the access point device RF-to-DATA converter circuit, for providing a continuous digital stream in the absence of data signals for providing generally continuous signals to be combined with the voice signals when data is not present; and
  combining hardware for combining and separating voice signals and data signals in the remote access point;
  an optical fiber system coupled between the hub device and the remote access point device and operable for modulating and demodulating the combined voice and data signals for communicating between the hub device and remote access point device.

15. The system of claim 14 wherein said hub device data hardware comprises a network connection for coupling to a data network for processing data through the network.

16. The system of claim 14 wherein said network connection is an 802.3 Ethernet connection.

17. The system of claim 14 wherein the RF-to-DATA circuit, in at least one of the hub device or access point device, comprises circuitry for providing Manchester modulation and demodulation.

18. The system of claim 14 wherein said optical fiber system is operable for modulating and demodulating the combined signals for communication over optical fiber.

19. The system of claim 14 wherein said RF-to-DATA circuit, in at least one of the hub device or access point device, includes amplification circuitry for amplifying signals converted between a data network format and the appropriate RF format.

20. The system of claim 14 wherein said remote access point device comprises an antenna for transceiving signals with customer equipment.

21. The system of claim 20 wherein said voice hardware of the remote access point device is coupled to the antenna.

22. The system of claim 20 wherein said data hardware of the remote access point device is coupled to the antenna.

23. The system of claim 20 wherein both of said voice hardware and data hardware of the remote access point device are coupled to the antenna.

24. The system of claim 14 wherein said data hardware of the remote access point device is operable for processing data signals in an 802.11 wireless network format.

25. The system of claim 14 wherein said optical fiber system includes an optical fiber cable coupled between the hub device and the remote access, the cable including a fiber strand for carrying primarily voice signals and including a fiber strand for carrying primarily data signals.

26. The system of claim 14 wherein said optical fiber system includes an optical fiber cable coupled between the hub device and the remote access point device, the cable including a fiber strand for carrying the combined voice and data signals.

27. A wireless voice and data system for improving coverage in an enclosed area, the system comprising:
a main hub device for transceiving RF signals with a signal source positioned generally removed from an enclosed area, the main hub device including voice hardware for processing voice signals;
the main hub device further including data hardware for processing data signals, and combining hardware for combining and separating voice signals and data signals in the main hub device;
at least one hub device coupled to the main hub device and including voice hardware for processing voice signals in an RF wireless voice format that is used for RF wireless voice communications and data hardware for processing data signals in a data network format that is different from the RF wireless voice format, an RF-to-DATA converter circuit operable for converting the data signals between the data network format and an appropriate RF format compatible with the RF wireless voice format in order to combine and separate the voice signals and data signals in the hub device, the RF-to-DATA converter circuit including circuitry for providing a continuous digital stream in the absence of data signals for providing generally continuous signals to be combined with the voice signals when data is not present; and combining hardware for combining and separating voice signals and data signals in the hub device;
at least one remote access point device for transceiving signals with customer equipment, the remote access point device including voice hardware for processing voice signals in the RF wireless voice format, data hardware for processing data signals in the data network format, and combining hardware for combining and separating voice signals and data signals in the remote access point;
an optical fiber system coupled between the hub device and the remote access point device and operable for modulating and demodulating the combined voice and data signals for communicating between the hub device and remote access point device.

28. A wireless system for improving coverage in an enclosed area, the system comprising:
a hub device for transceiving RF signals with a signal source and including voice hardware for processing voice signals in an RF wireless voice format that is used for wireless voice communications, a remote access point device for transceiving signals with customer equipment and including voice hardware for processing voice signals in the wireless voice format, and an optical fiber system operable for modulating and demodulating the voice signals for communicating between the hub device and remote access point device; the hub device further including:
data hardware for processing data signals in a data network format that is different from the RF wireless voice format;
an RF-to-DATA converter circuit operable for converting the data signals between the data network format and an appropriate RF format compatible with the RF wireless voice format in order to combine and separate the voice signals and data signals in the hub device,
circuitry, in the RF-to-DATA converter circuit, for providing a continuous digital stream in the absence of data signals for providing generally continuous signals to be combined with the voice signals when data is not present;
combining hardware for combining and separating voice signals and data signals in the hub device;
the optical fiber system operable for modulating and demodulating the combined voice and data signals for optically communicating both voice and data between the hub device and remote access device.

29. The system of claim 28 wherein said hub device data hardware comprises a network connection for coupling to a data network for processing data through the network.

30. The system of claim 28 wherein said network connection is an 802.3 Ethernet connection.

31. The system of claim 28 wherein said RF-to-DATA circuit includes amplification circuitry for amplifying signals converted between a data network format and an RF format.

32. The system of claim 28 wherein the RF-to-DATA circuit comprises circuitry for providing Manchester modulation and demodulation.

33. The system of claim 28 wherein said optical fiber system is operable for modulating and demodulating the combined RF signals for communication over optical fiber.

34. The system of claim 28 wherein said remote access point device further comprises an RF-to-DATA circuit for converting signals between a data network format and an RF format for combining and separating voice signals and data signals in the remote access point device.

35. The system of claim 28 wherein said remote access point device comprises an antenna for transceiving signals with customer equipment.

36. The system of claim 35 wherein said data hardware of the remote access point device is coupled to the antenna.

37. The system of claim 35 wherein both of said voice hardware and data hardware of the remote access point device are coupled to the antenna.

38. The system of claim 28 wherein said data hardware of the remote access point device is operable for processing data signals in an 802.11 wireless network format.

39. The system of claim 28 wherein said optical fiber system includes an optical fiber cable coupled between the hub device and the remote access point device, the cable including a fiber strand for carrying primarily voice signals and including a fiber strand for carrying primarily data signals.

40. The system of claim 28 wherein said optical fiber system includes an optical fiber cable coupled between the hub device and the remote access point device, the cable including a fiber strand for carrying combined voice and data signals.

41. A method of improving wireless communication in an enclosed area, the method comprising:

- transceiving RF signals between a signal source and a hub device and processing RF voice signals in an RF wireless voice format that is used for RF wireless voice communications with voice hardware in the hub device;
- transceiving data signals in a data network format that is different from the RF wireless voice format between a network and the hub device and processing the data signals with data hardware;
- with an RF-to-DATA converter circuit, converting, in the hub device, the data signals between the data network format and an appropriate RF format compatible with the RF wireless voice format in order to combine and separate the voice signals and data signals;
- when converting the data signals between a data format and an RF format, providing a continuous digital stream in the absence of data signals for providing generally continuous signals to be combined with the voice signals when data is not present;
- combining and separating voice signals and RF format data signals in the hub device;
- optically communicating combined voice and data signals between the hub device and a remote access point device.

42. The method of claim 41 further comprising transceiving data signals between the remote access point device and customer equipment, the remote access point device including data hardware for processing data signals.

43. The method of claim 41 further comprising combining and separating voice signals and RF format data signals in the remote access point device.

44. The method of claim 43 further comprising transceiving data signals between the remote access point device and customer equipment in an 802.11 format.

45. The method of claim 43 further comprising transceiving data signals between the remote access point device and customer equipment with an antenna.

46. The method of claim 45 further comprising transceiving data signals in an 802.11 wireless network format.

47. The method of claim 41 further comprising communicating combined voice and data signals between the hub device and a remote access point device with an optical fiber system operable for modulating and demodulating the combined voice and data signals.

48. The method of claim 47 wherein said optical fiber system includes an optical fiber cable coupled between the hub device and the remote access point device, the method comprising communicating the voice and data signals of the combined signals over a common fiber strand of the cable.

49. The method of claim 41 further comprising transceiving data signals between a network and the hub device in an 802.3 Ethernet format.

50. The method of claim 41 further comprising communicating the combined voice and data signals over optical fiber.

51. The method of claim 41 further comprising communicating combined voice and data signals between the hub device and a remote access point device with an optical fiber system operable for modulating and demodulating the combined voice and data signals.

52. The method of claim 47 wherein said optical fiber system includes an optical fiber cable coupled between the hub device and the remote access point device, the method comprising communicating the voice signals of the combined signals over a fiber strand of the cable and communicating the data signals of the combined signals over another fiber strand of the cable.

* * * * *